Aug. 12, 1941.    W. LINDSAY    2,251,909
SEPARATION OF SOLID MATERIAL FROM LIQUID MATERIAL
Filed Jan. 23, 1939    2 Sheets-Sheet 1

INVENTOR.
William Lindsay
BY McLaughlin & Wallenstein
ATTORNEYS

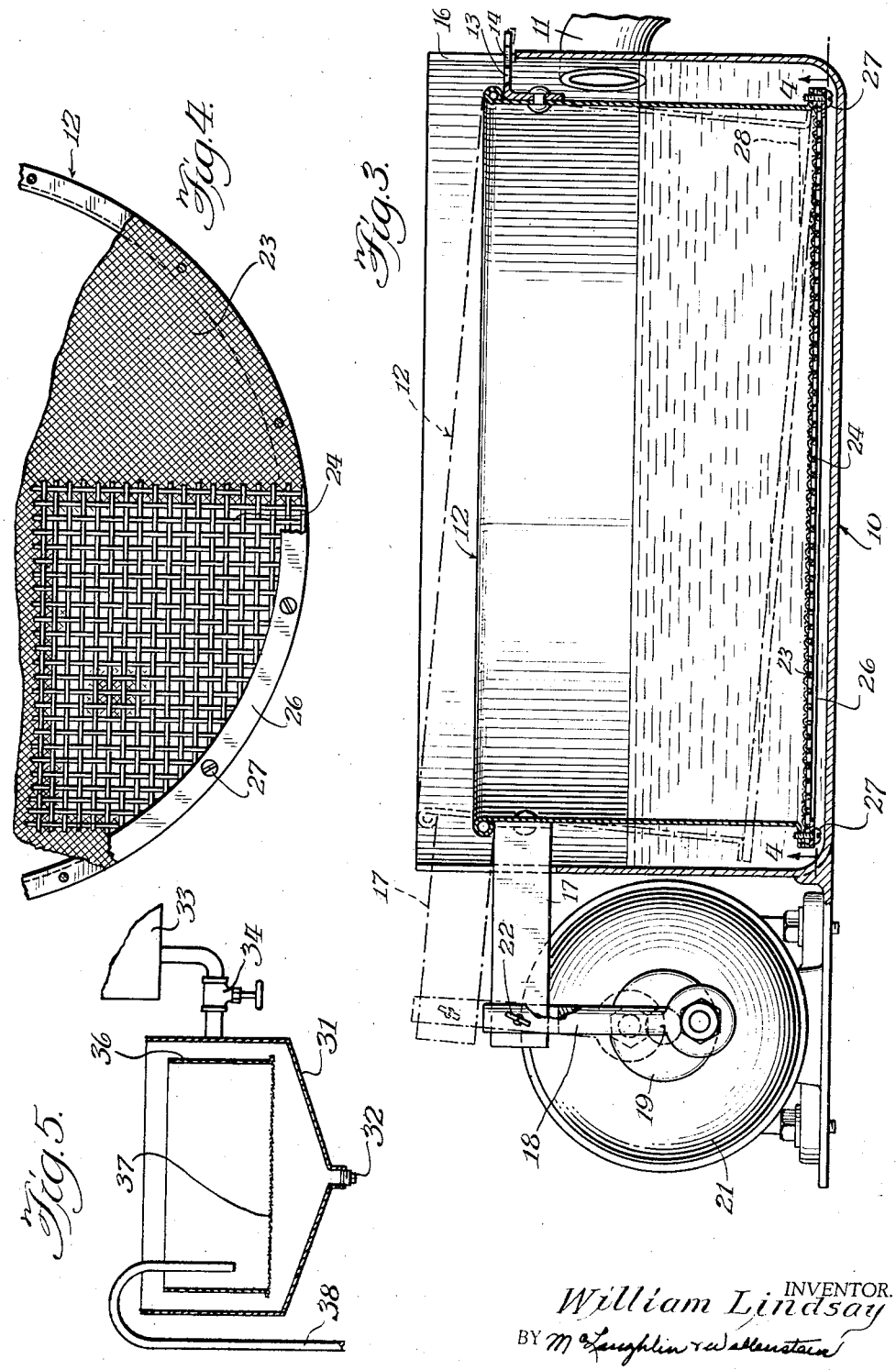

Patented Aug. 12, 1941

2,251,909

UNITED STATES PATENT OFFICE 2,251,909

SEPARATION OF SOLID MATERIAL FROM LIQUID MATERIAL

William Lindsay, Chicago, Ill., assignor to Rotospray Manufacturing Company, Chicago, Ill.

Application January 23, 1939, Serial No. 252,290

7 Claims. (Cl. 210—149)

My invention relates generally to the separation of solid material from liquid material and more particularly to the separation of relatively extremely divided solid particles from such relatively viscous materials as high grade lacquers and the like.

In the preparation of paints, lacquers, enamels, and similar materials intended for application to surfaces as coatings, it is deemed essential, as a final processing step, to remove solid particles which have become introduced during process of manufacture and the presence of which would cause blemishes in the finished surface. At times these materials may be removed in part with ordinary gravity strainers, sometimes with centrifuges, and by the use of other usual types of equipment adapted for performing a cleaning, straining, or screening operation. The character of the material determines to a great extent the type of equipment used, but, for my present purpose, it is unnecessary to consider this phase of the problem. It is sufficient to say that with some types of materials, particularly certain types of very fine lacquers, the only possible manner of cleaning is by the use of certain types of centrifugal separators, but this use is very objectionable in two essential respects. In the first place, there is a tendency to remove materials other than those desired to be removed, and, secondly, the removed material has a tendency to pack so hard in places where it is capable of lodging in the equipment that sometimes several hours are required to perform a simple cleaning operation. The use of fine mesh strainers has been found impossible because of the quickness with which the strainers become clogged. This difficulty of the clogging of strainers is found to exist outside of the paint and lacquer industry, but the problem is particularly acute in the industry mentioned.

The principal object of my invention is the provision of an improved straining or screening method.

Another object is the provision of improved equipment for removing undesirable finely divided particles from such materials as fine lacquers.

A further object is to avoid the difficulties and objections to methods and equipment discussed hereinabove.

In carrying out my improved method, I employ a relatively very fine mesh screen containing, for example, 200 to 300 meshes to the inch, and suspend this screen between a body of the liquid material to be filtered and the filtrate in such a manner that the filter or screen is at all times covered with liquid material. By then causing the screen to be moved relatively slowly, alternately toward the body of filtrate and body of liquid material to be filtered, and maintaining the hydraulic flow in the direction of the filtrate, continuous filtration or screening takes place with very little or no clogging of the meshes of the screen. According to a preferred method, the fine mesh screen comprises the bottom of a container placed within but spaced from an outer container. The inner container is reciprocated in a generally vertical direction, such as by oscillating it gently about a pivot located at one side thereof, and the material is either introduced into the outer container or into the inner container, and, in either case, removed from the side of the screen to which the filtrate flows. An adequate differential in the height of the liquid in the two containers is maintained to cause a gentle but substantially continuous flow through the screen, with the result that screening or filtering is carried on substantially continuously with only occasional stops for cleaning, and without appreciable clogging of the fine meshes of the screen.

Referring now to the drawings—

Fig. 3 is a transverse sectional view taken on the line 3—3 of Fig. 1 looking in the direction of the arrows, the dotted line position in this figure indicating a position to which the inner container is moved during operation of the device;

Fig. 4 is a fragmentary, bottom plan view of the inner container such as would be taken along the line 4—4 of Fig. 3 looking in the direction of the arrows; and Fig. 5 is a transverse, sectional view, partly in elevation, showing more or less schematically a modified arrangement.

Figure 1:
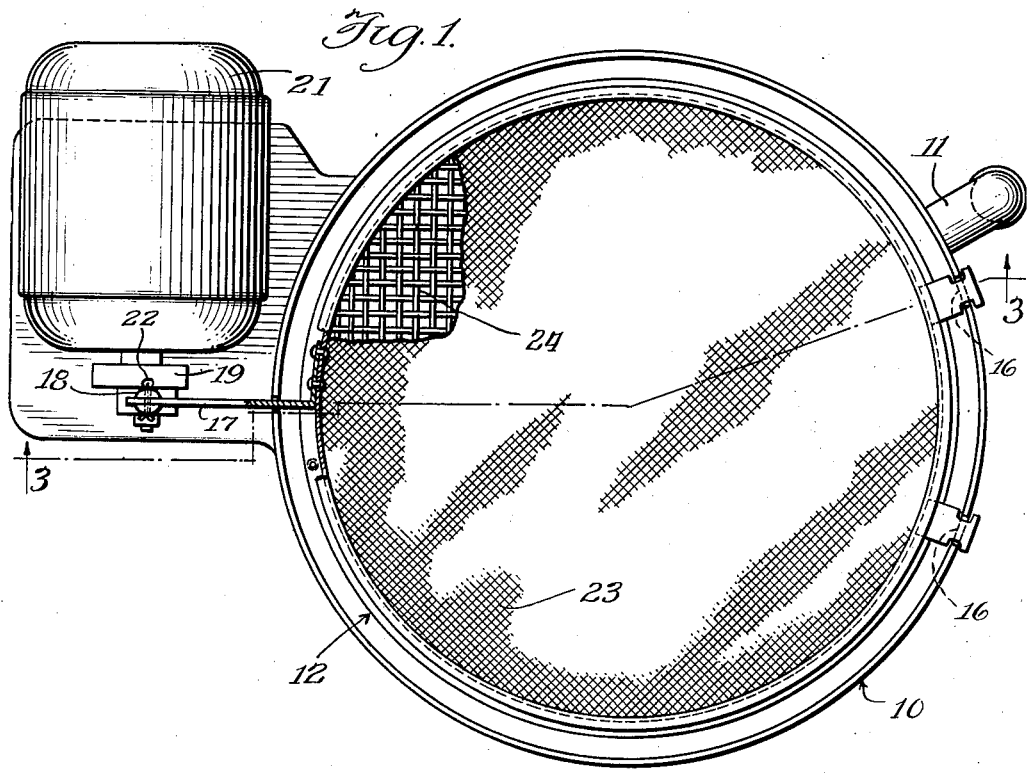
Fig. 1 is a plan view, partly in section, illustrating one form of device made in accordance with my invention.
Figure 2:
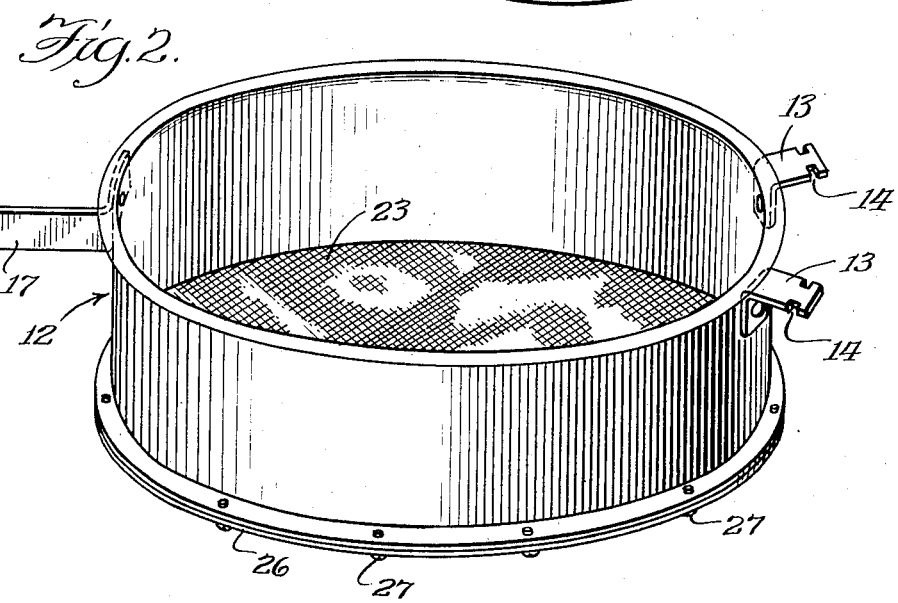
Fig. 2 is a perspective view of the inner container.

Referring now first to Figs. 1 to 4, inclusive, I show an outer container 10, having bottom and side walls, this container being adapted for mounting on a suitable support (not shown). An outlet spout 11 is provided through which the filtrate is adapted to flow to a suitable receptacle, for example, containers in which a liquid product may be vended. Within the container 10, but spaced therefrom, is an inner container 12. A pair of brackets 13 are secured to an upper edge of the inner container, these brackets being cut away at 14 to engage in slots 16 formed in the upper peripheral edge of the outer container 10. By this means, a hinge or pivot connection is provided at one side between the inner and outer container. At the opposite side of the container 12, I provide a lift bracket 17 adapted to engage in a bifurcation of an arm 18, eccentrically secured in the manner shown in Fig. 3 to a driven member 19. This driven member is operated slowly by means of a motor 21, which may be either a relatively very slowly operated motor or preferably comprises a single housing for motor and reduction gears so that the speed of rotation of the driven member 19 may be greatly below the speed of rotation of the motor. The particular arrangement of the motor and drive are not of importance in my present invention, and, as to the speed at which the member 19 is driven, this will be referred to in the discussion of the operation of the deivec.

As the driven member 19 rotates, the bifurcated arm 18 is raised and lowered from substantially the full line position to the dotted line position (Fig. 3). A suitable pin 22 extending through the bracket 17 and through the bifurcations of the arm 18 holds the parts assembled, but is relatively easily removed should it be desired to remove the container 12 for any purpose, for example, cleaning.

The bottom of the container 12 comprises a fine mesh screen 23 having, for example, 150 to 300 meshes per inch, the exact number depending upon the material being handled in the device. I preferably use a relatively heavy screen 24 as a support for the screen 23, and these two screens are assembled conveniently by providing a flange on the container 12, as shown in the drawings, and an annulus 26, the two screens being secured between the annulus and flange, for example, by means of screws 27.

In operating the device shown in Figs. 1 to 4, inclusive, in accordance with my improved method, the inner container is reciprocated about its pivot formed by the brackets 13 relatively slowly, the exact speed depending upon conditions. In general, there should be at least approximately five reciprocations per minute, and there may be as many as twenty-five or thirty reciprocations per minute. I have found that for many materials, such as many high grade lacquers, about ten to fifteen reciprocations per minute produces the desired results when a 200 mesh screen is employed.

The spout 10 being open acts as an over-flow, removing liquid material from the outer container substantially down to the lower edge of the opening thereof. The material to be filtered is introduced into the inner container 12 either gradually by hand or by means of any suitable feeding apparatus, the level being maintained somewhat above the level in the outer container but not sufficiently high to produce an appreciable pressure against the fine mesh screen such as might so drive solid particles into the meshes of the screen as to prevent their ready removal. Because of the difference in the level, there is a tendency for a gradual movement of the liquid portion of the material through the fine mesh screen. However, it will be recognized that this movement would normally be arrested relatively quickly by the clogging of the screen with solid particles. As the reciprocation of the inner container continues, however, there is a washing action of the screen such as to remove the solid particles lodged against the screen, and the gradual movement of these particles toward the pivoted side where they accumulate in the form of a relatively thin layer 28, as shown in Fig. 3.

It should be remembered that the type of material handled in equipment of this kind very often will contain only very small amounts of material to be removed, and so the device as illustrated in Figs. 1 to 4, inclusive, may be operated for a relatively long period of time without cleaning. Should cleaning be desired, however, it is merely necessary to remove the pin 22, lift the container 12, replace it with another container which is kept available, and continue with the operation. The screen on the removed container then is very readily cleaned.

Using substantially the construction shown in Figs. 1 to 5, inclusive, it may be desirable to direct the flow in the opposite direction to that described. Simple modifications which may be employed for this purpose are illustrated in Fig. 5. In this form, an outer container 31 is provided, having its bottom shaped in the general manner of a sump, and provided with a suitable drain plug 32. The material to be filtered, which may be contained in a receptacle 33, is delivered to the outer container 31 through a valve 34 which regulates the flow. An inner container 36 is provided with a fine mesh screen 37, and is disposed to be reciprocated substantially vertically in the general manner illustrated in Fig. 3. The filtrate enters the inner container 36 and is removed therefrom by suitable means such as a siphon 38. This form of the device may, in general, be run for a somewhat longer period of time without cleaning, because the material to be filtered, approaching the screen from the bottom side thereof, does not cause an accumulation of solid particles directly in contact with the screen. Because of their fine state of subdivision, these particles will not usually fall by gravity to the bottom of the container 31, but there will tend to be a gradual accumulation of material in the lower part of the container 31 having much more than the usual concentration of solid particles. When this accumulation reaches such a point that free operation is no longer possible, a small portion of the contents may be removed through the drain 32 and this will effectively clear the condition. If desired, of course, the valve 34 may be cut off entirely and the entire contents drained and the containers flushed out with solvent.

I have referred above to the use of screens having from 150 to 300 meshes per inch. For many of the substances which may be processed in accordance with my invention, this character of screen is very desirable. However, the screens may have as low as 40 meshes per inch, or as high as 400 meshes per inch, but this is not the general rule. Usually, also, the speed of reciprocation is concisely proportional to the screen size, but at times this relationship will not prevail.

While my invention is particularly applicable to the paint, lacquer, varnish, enamel and such industries, it is also adapted for use wherever the same general types of problems are encountered and the same general types of materials treated. It is believed that those skilled in the art will understand from the above description how to practice my improved method. While details have been given for the benefit of those skilled in the art, the invention is limited only by the scope of the appended claims.

What I claim as new and desire to protect by Letters Patent of the United States is:

1. In a filter of the class described, a container having bottom and side walls, a second container having bottom and side walls, the bottom wall of said second container comprising a relatively fine mesh screen, said second container disposed within the first container but spaced therefrom, hinge means connecting said containers at one side thereof, means for relatively slowly reciprocating said second container vertically about said hinge means as a horizontal pivot, and means for passing liquid material through said containers and through said screen in such a manner as to keep said screen submerged, with one side in contact with the liquid material to be filtered and the other side in contact with the filtrate.

2. In a filter of the class described, a container having bottom and side walls, a second container having bottom and side walls, the bottom wall of said second container comprising a relatively fine mesh screen, said second container disposed within the first container but spaced therefrom, hinge means connecting said containers at one side thereof, means for relatively slowly reciprocating said second container vertically about said hinge means as a horizontal pivot, means for introducing liquid material into said second container, and outlet means in the second container adapted to maintain liquid filtrate therein above the level of said screen.

3. In a filter of the class described, a container having bottom and side walls, a second container having bottom and side walls, the bottom wall of said second container comprising a relatively fine mesh screen, said second container disposed within the first container but spaced therefrom, hinge means connecting said containers at one side thereof, means for relatively slowly reciprocating said second container vertically about said hinge means as a horizontal pivot, means for introducing liquid material into said first container, and means for withdrawing liquid material from said second container while maintaining the level of filtrate sufficiently high to keep said screen covered therewith.

4. In a filter of the class described, a container having bottom and side walls, a second container having bottom and side walls, the bottom wall of said second container comprising a relatively fine mesh screen, said second container disposed within the first container but spaced therefrom, hinge means connecting said containers at one side thereof, means for relatively slowly reciprocating said second container vertically about said hinge means as a horizontal pivot, outlet means in the side wall of the first container, said means being above the level of said screen, and means for maintaining a supply of liquid material to be filtered in the second container above the level of liquid filtrate in the first container.

5. A filter as defined in claim 4, wherein the fine mesh screen contains 150 to 300 meshes per inch.

6. A filter as defined in claim 4, wherein said reciprocating means is formed to produce between 10 and 15 reciprocations per minute.

7. A filter as defined in claim 4, wherein said reciprocating means is formed to produce between 10 and 15 reciprocations per minute and said fine mesh screen has between 150 and 300 meshes per inch.

WILLIAM LINDSAY.